(12) United States Patent
Watanabe et al.

(10) Patent No.: US 9,505,295 B2
(45) Date of Patent: Nov. 29, 2016

(54) STRUCTURE FOR FRONT SECTION OF VEHICLE BODY

(71) Applicant: HONDA MOTOR CO., LTD., Minato-ku, Tokyo (JP)

(72) Inventors: Yasunori Watanabe, Wako (JP); Akihisa Kudoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/761,959

(22) PCT Filed: Jan. 15, 2014

(86) PCT No.: PCT/JP2014/050535
§ 371 (c)(1),
(2) Date: Jul. 20, 2015

(87) PCT Pub. No.: WO2014/119363
PCT Pub. Date: Aug. 7, 2014

(65) Prior Publication Data
US 2015/0314810 A1 Nov. 5, 2015

(30) Foreign Application Priority Data
Jan. 30, 2013 (JP) ................................. 2013-015365

(51) Int. Cl.
    *B60K 5/12* (2006.01)
    *B62D 21/11* (2006.01)
    *B62D 25/08* (2006.01)

(52) U.S. Cl.
    CPC ................. *B60K 5/12* (2013.01); *B62D 21/11* (2013.01); *B62D 25/082* (2013.01)

(58) Field of Classification Search
CPC ....... B62D 25/082; B62D 21/11; B60K 5/12
USPC .......................... 296/203.02, 203.04, 187.09
See application file for complete search history.

(56) References Cited

U.S. PATENT DOCUMENTS

| | | | |
|---|---|---|---|
| 6,398,262 B1 * | 6/2002 | Ziech | B60G 3/20 180/311 |
| 2008/0224502 A1 * | 9/2008 | Miki | B62D 25/082 296/203.02 |

(Continued)

FOREIGN PATENT DOCUMENTS

| | | |
|---|---|---|
| EP | 1 690 722 A2 | 8/2006 |
| JP | S60-26967 U | 2/1985 |

(Continued)

*Primary Examiner* — Pinel Romain
(74) *Attorney, Agent, or Firm* — Carrier Blackman & Associates, P.C.; William D. Blackman; Jingli Wang

(57) ABSTRACT

A structure for the front section of a vehicle body is provided with: a pair of left and right front side frames; a sub-frame which is disposed between the front side frames; a pair of left and right first mount members which are disposed below the front side frames; first affixation members which affix the first mount members to the lower sections of the front side frames; first support members which are provided within the front side frames and which support the first affixation members; and reinforcement members which reinforce damper housings. The reinforcement members are joined to the upper sections of the front side frames. The first support members are affixed to the inner surfaces of the front side frames at positions below the portions to which the reinforcement members are joined.

11 Claims, 7 Drawing Sheets

(56) References Cited

U.S. PATENT DOCUMENTS

| | | | |
|---|---|---|---|
| 2011/0095568 A1* | 4/2011 | Terada | B62D 21/11 296/187.09 |
| 2012/0187720 A1* | 7/2012 | Tomozawa | B62D 25/082 296/187.09 |
| 2013/0140852 A1 | 6/2013 | Takeda et al. | |

FOREIGN PATENT DOCUMENTS

| | | |
|---|---|---|
| JP | H04-005177 A | 1/1992 |
| JP | 2006-219068 A | 8/2006 |
| JP | 2011-088597 A | 5/2011 |
| WO | 2012/017747 A1 | 2/2012 |

\* cited by examiner

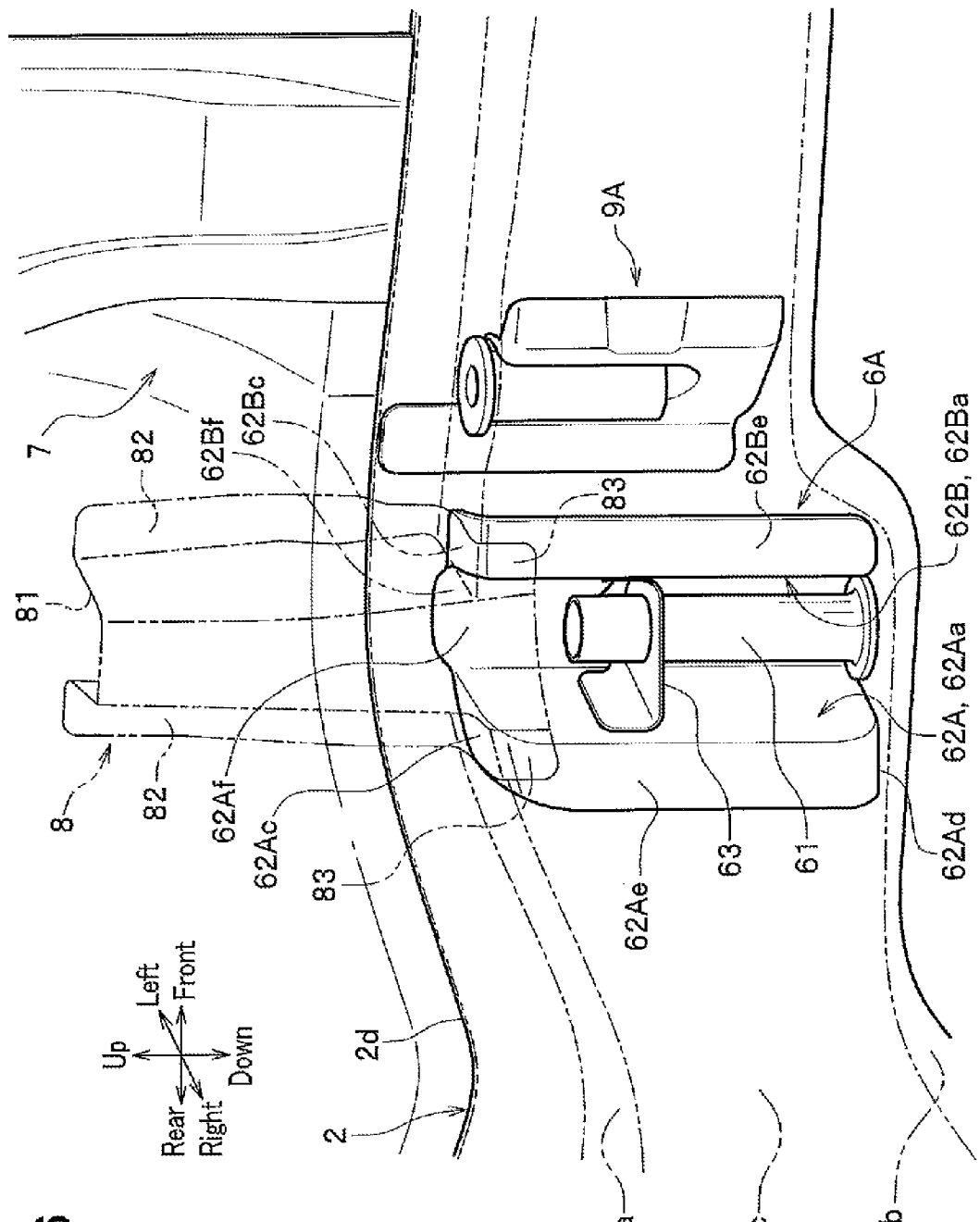

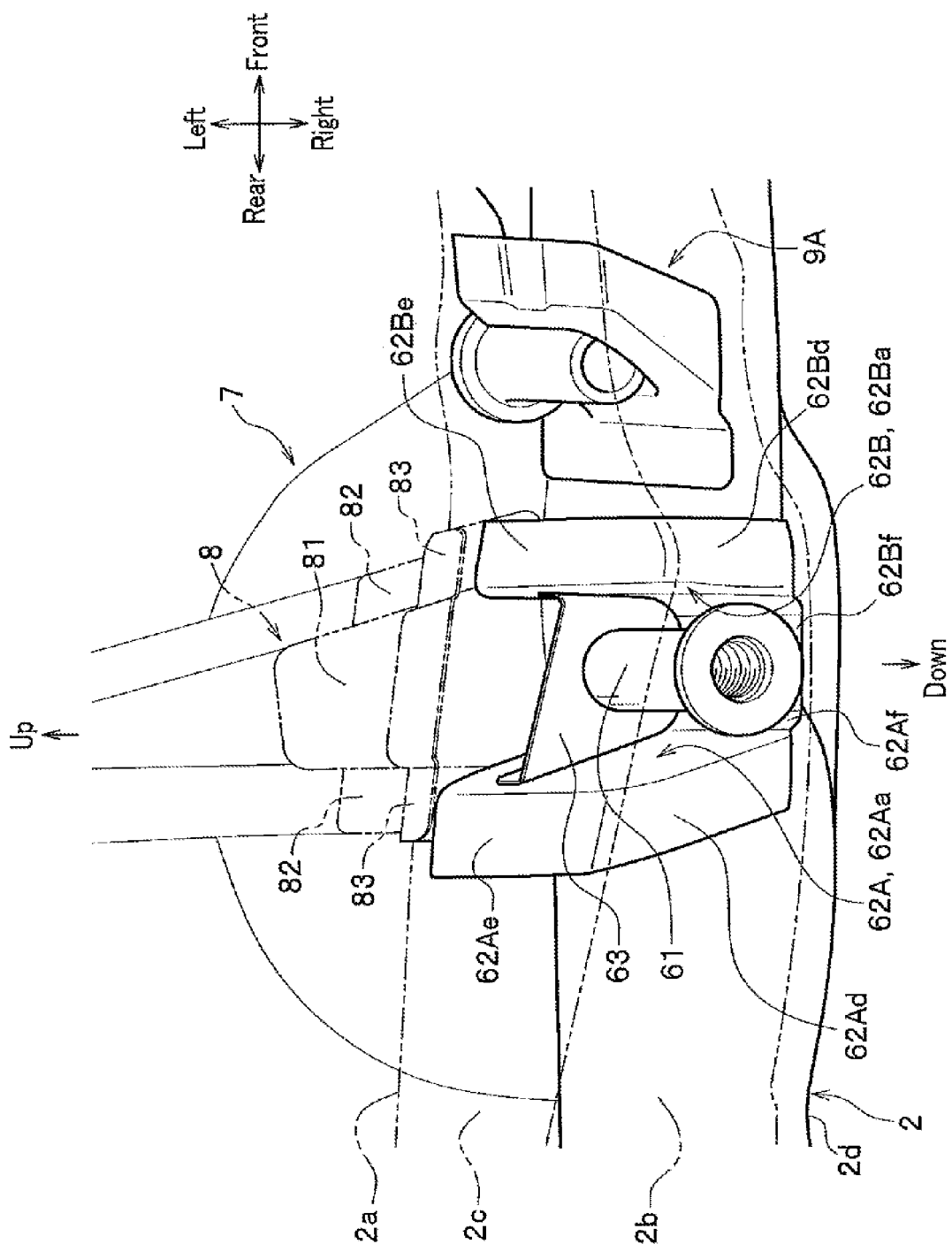

STRUCTURE FOR FRONT SECTION OF VEHICLE BODY

TECHNICAL FIELD

The present invention relates to a structure for a front section of a vehicle body. In the structure, mounting members for supporting a subframe is arranged below front side frames.

BACKGROUND ART

Conventionally, in some cases, a mounting member formed with a vibration isolating rubber part is arranged above or below each front side frame, and a power unit and a subframe are supported by the mounting members, where the power unit includes an engine and a transmission and is mounted on the subframe. For example, in the case where the mounting members are arranged below the front side frames, the mounting members are fastened with bolts to nuts arranged on lower walls inside the front side frames, and the subframe is supported by the mounting members.

Meanwhile, Patent Literature 1 discloses an installation structure for a mounting apparatus wherein, when an engine mount is to be arranged above the front side frames, nut members for fixing the engine mount are arranged on upper walls of the front side frames each having a closed cross section, and the nut members are fixed to supporting plates, which extend to form a partition almost dividing the inner spaces of the front side frames. In the structure disclosed in Patent Literature 1, the inclination angles of the above supporting plates with respect to the length direction of the side frames are set such that the positions at which the front side frames are deformed by bending can be optimized.

CITATION LIST PATENT LITERATURES

Patent Literature 1: Japanese Patent Laid-open No. 2006-219068 (FIGS. 4 and 5)

SUMMARY OF INVENTION

Technical Problem

In the conversional structure in which the mounting members are fastened on the lower sides of the front side frames, the support rigidity of the mounting members can be secured by only the rigidity of the lower walls of the front side frames on which the nuts are fixed, so that the entire rigidity of the front side frames is not actually utilized. Therefore, only the increase in the thickness of the lower walls of the front side frames can increase the support rigidity. That is, the capability of coping with a large load is limited.

In addition, Patent Literature 1 discloses only the case in which the mounting members are arranged above the front side frames, and does not mention the other portions. Therefore, although the structure disclosed in Patent Literature 1 locally enables a desirable deformation, the structure disclosed in Patent Literature 1 has a problem in load absorption over the entire length of the front side frames at the time of a crash.

The present invention has been made in view of the above problems, and provides a structure for a front section of a vehicle body enabling improvement in the support rigidity of mounting members arranged on the lower sides of front side frames.

Solution to Problem

The structure for a front section of a vehicle body according to the present invention is characterized in including: a pair of front side frames which are respectively arranged on right and left sides of the front section of the vehicle body, have a hollow structure, and extend in a front-rear direction; a subframe which is arranged between the pair of front side frames; a pair of first mounting members which are respectively arranged on the right and left sides below the pair of front side frames, and respectively support right and left ends of the subframe; first fixing members which fix the first mounting members to lower portions of the front side frames; first supporting members which are arranged inside the front side frames, and support the first fixing members; and reinforcing members which reinforce the vehicle body. In the above structure for the front section, the reinforcing members are joined to upper portions of the front side frames; and the first supporting members are fixed to inner surfaces of the front side frames below positions at which the reinforcing members are joined.

According to the above structure, the reinforcing members which reinforce the vehicle body are joined to the upper portions of the front side frames, and the first supporting members which support the first fixing members are fixed to the inner surfaces of the front side frames below the positions at which the reinforcing members are joined to the front side frames. Therefore, the support rigidity of the first networking members contributed by the front side frames is improved.

In addition, it is preferable that the reinforcing members extend in the vertical direction of the vehicle, and reinforce damper housings, in the structure.

According to the above structure, the support rigidity of the first mounting members can be improved by using the reinforce members which reinforce the damper housings.

Further, it is preferable that the first supporting members include a holding portion and a pair of partition portions, the holding portion hold the first fixing members, and the pair of partition portions be respectively arranged on front and rear sides of the holding portion, and be fixed to the inner surfaces of the front side frames.

According to the above structure, the first supporting members each include the holding portion (which holds the first fixing members) and the pair of partition portions (which are respectively arranged on the front and rear sides of the holding portion and fixed to the inner surfaces of the front side frames). Therefore, the support rigidity of the first supporting members is further improved compared with the case in which only a single partition portion is arranged. Thus, the front side frames can be deformed to intended directions. In addition, since the extent of overlap of the reinforcing members and the first mounting members in the vertical direction increases, the support rigidity of the first mounting members is further improved.

Furthermore, it is preferable that the structure for a front section of a vehicle body according to the present invention further include: second mounting members which are arranged above the front side frames, and support a power unit; second fixing members which fix the second mounting members to upper portions of the front side frames; and second supporting members which are arranged inside the front side frames, and support the second fixing members; where each of the first supporting members and the second supporting members includes a partition portion, which extends across an inner space in the front side frames in the vehicle width direction, and the partition portion is fixed to an inner surface of the front side frames with an individually predetermined inclination angle with respect to a direction in which the front side frames extend.

According to the above structure, the partition portions in the first supporting members and the second supporting members are fixed to the inner surfaces of the front side frames with individually predetermined inclination angles with respect to the direction in which the front side frames extend, such that the front side frames appropriately deform when a crash occurs. Thus, the load at the time of a crash can be absorbed by appropriately deforming the front side frames in their entire length when the crash occurs.

Moreover, it is preferable that the partition portions in the first supporting members and the partition portions in the second supporting members be fixed to the inner surfaces of the front side frames with inclination angles, which are set such that the partition portions in the first supporting members and the partition portions in the second supporting members are arranged nonparallel to each other in plan view.

According to the above structure, the inclination angles of the partition portions in the first supporting members and the partition portions in the second supporting members are set such that the partition portions in the first supporting members and the partition portions in the second supporting members are arranged nonparallel to each other in plan view. Therefore, when a crash occurs, the front side frames deform such that the front side frames project toward the narrower side of the nonparallel arrangement. Thus, the load can be absorbed by appropriately deforming the front side frames.

Advantageous Effect of Invention

According to the present invention, it is possible to provide a structure for a front section of a vehicle body enabling improvement in the support rigidity of mounting members arranged on the lower sides of front side frames.

BRIEF DESCRIPTION OF THE DRAWINGS

FIG. 6 is an upper front right perspective view of a first supporting member in a variation.

FIG. 7 is a lower right perspective view of the first supporting member in the variation.

DESCRIPTION OF EMBODIMENTS

The first embodiment of the present invention is explained with reference to FIGS. 1 to 5 in detail. In the explanations, identical elements respectively are referred to by identical numbers, and the same explanations are not repeated. In the following explanations, the front, rear, right, left, up, and down directions are based on the driver's position, and the vehicle width direction is the right-left (lateral) direction.

Figure 1:
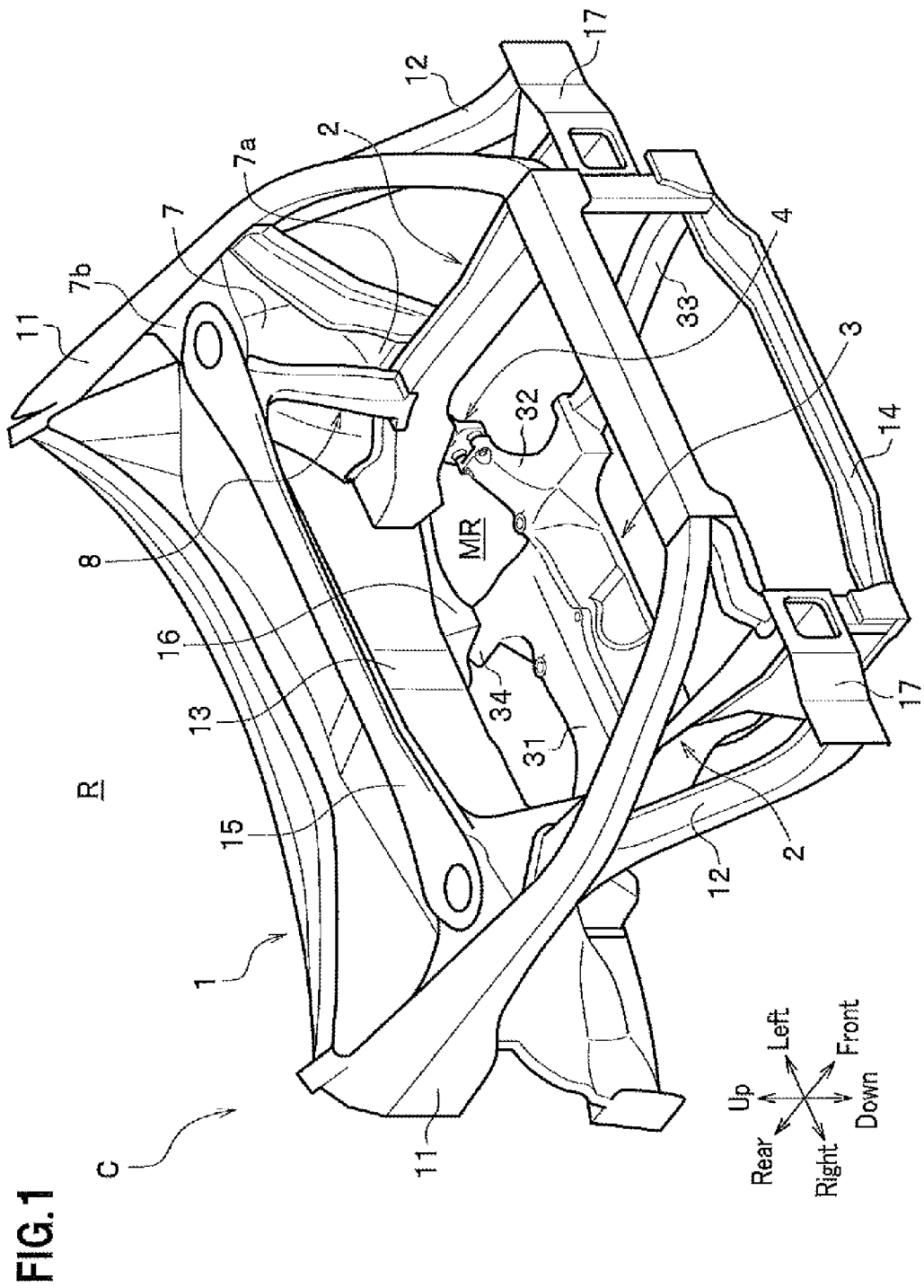
FIG. 1 is a perspective view of a structure of a front section of a vehicle body according to a first embodiment.
Figure 2:
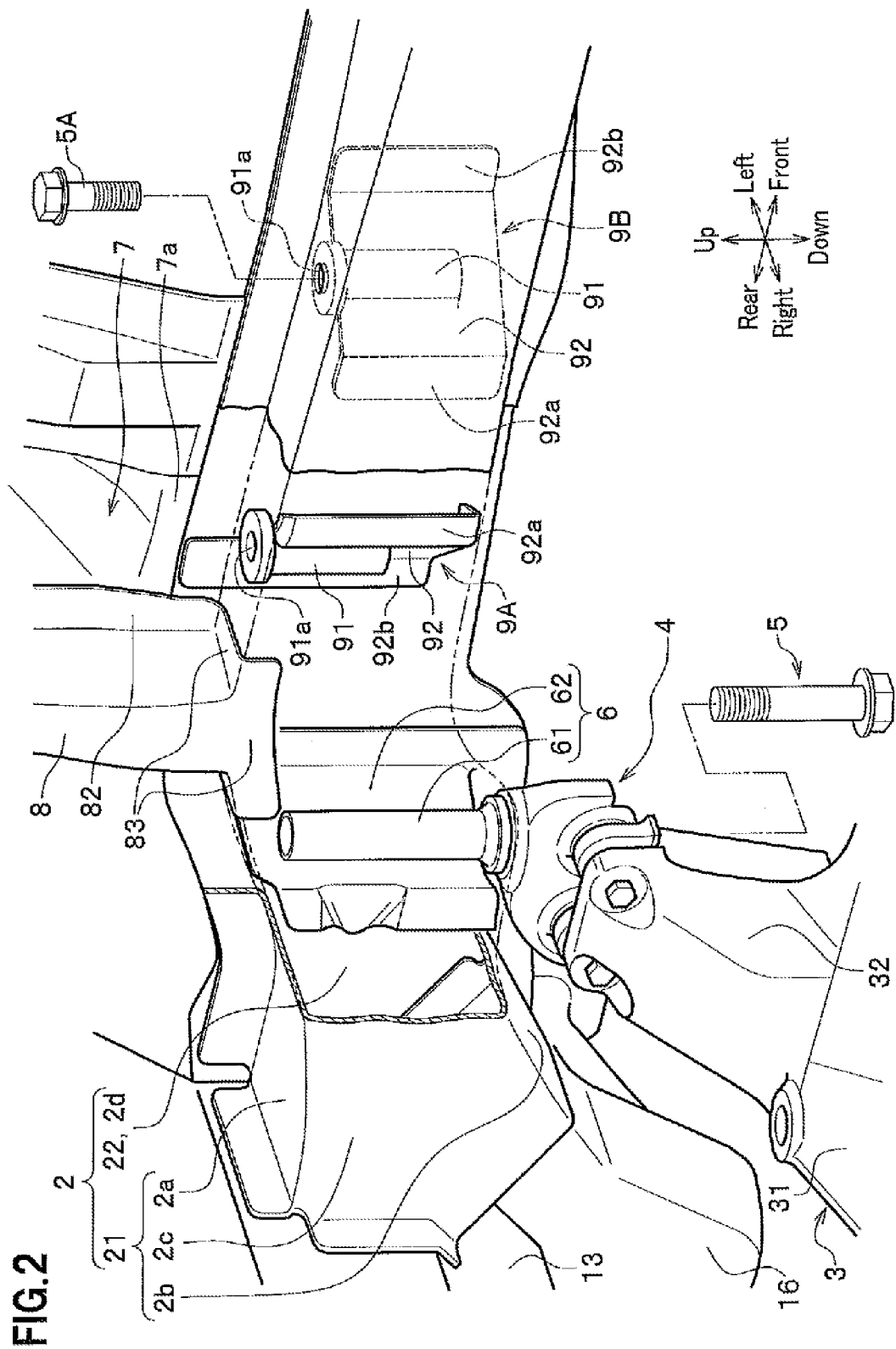
FIG. 2 is an enlarged perspective view of a portion connecting a front side frame and a subframe.
Figure 3A:
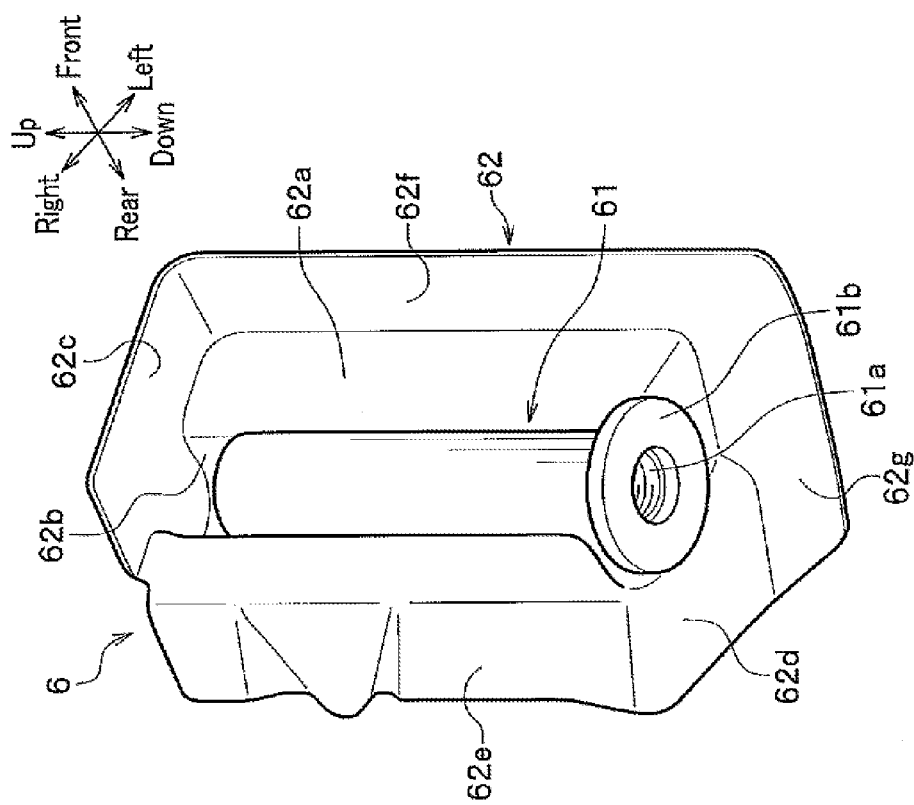
FIG. 3A is an upper front right perspective view of a first supporting member on the left side.
Figure 3B:
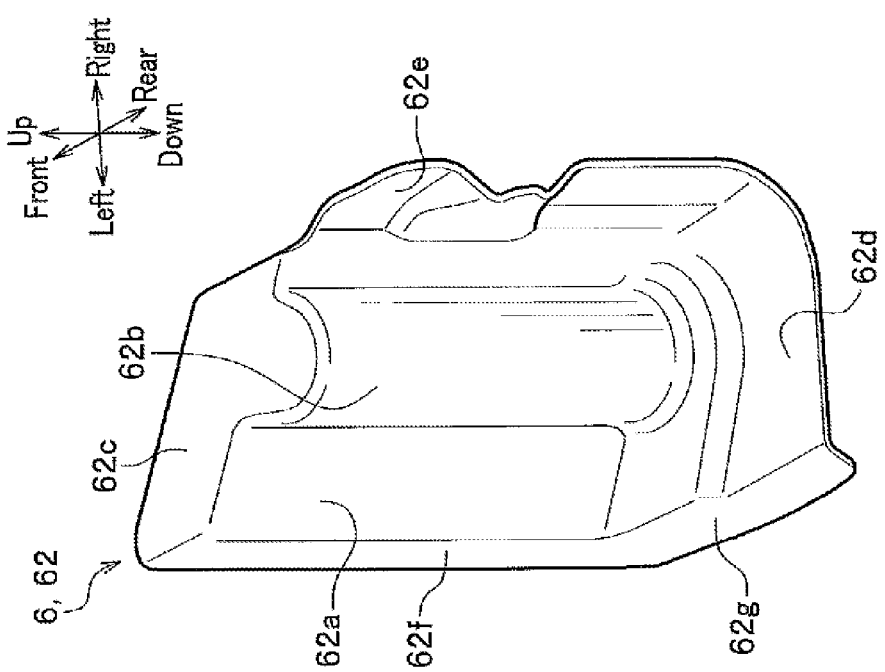
FIG. 3B is an upper rear left perspective view of the first supporting member on the left side.
Figure 4:
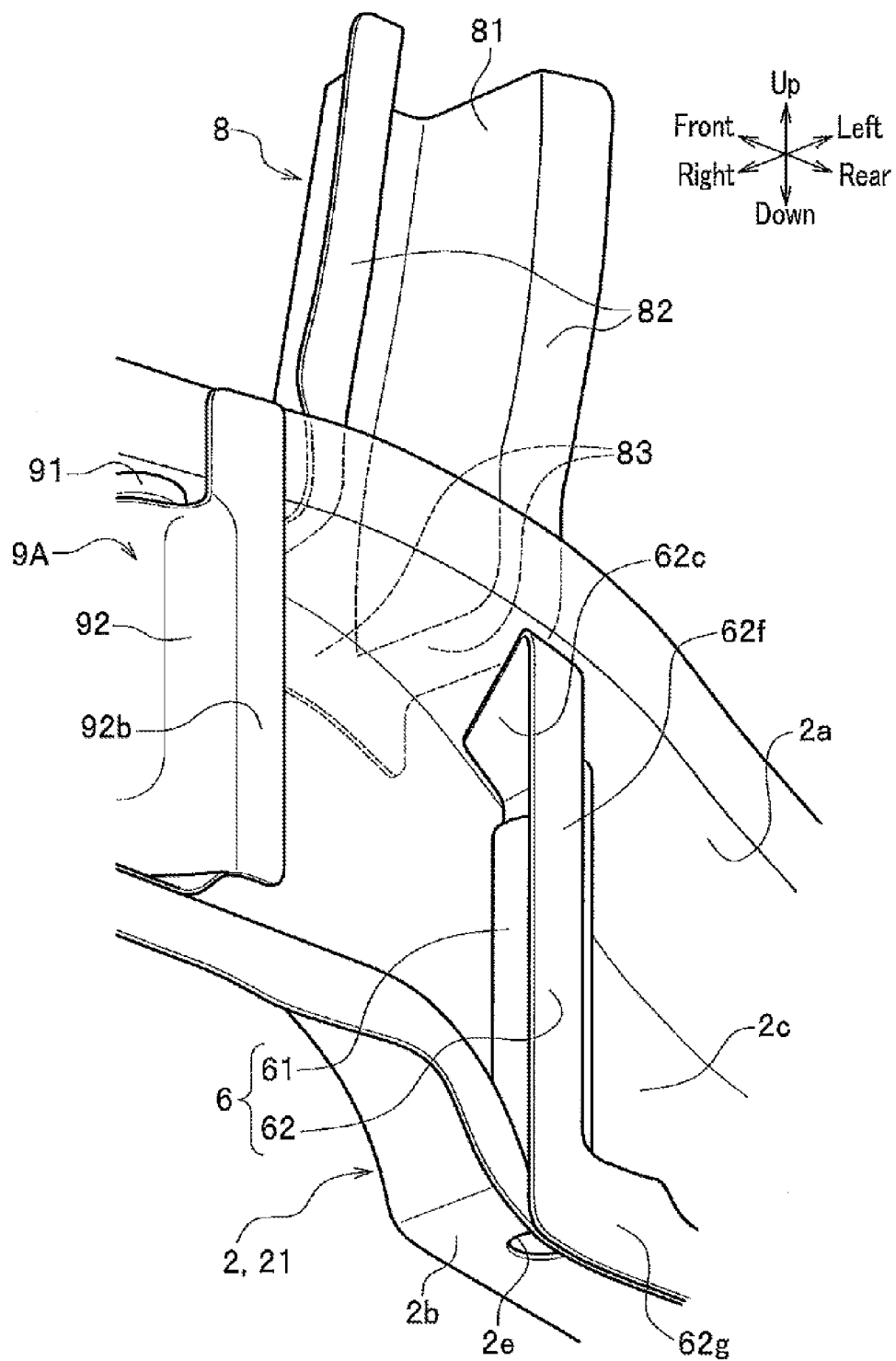
FIG. 4 is a lower front left perspective view of a connection of the front side frame on the left side and a reinforcing member.
Figure 5:
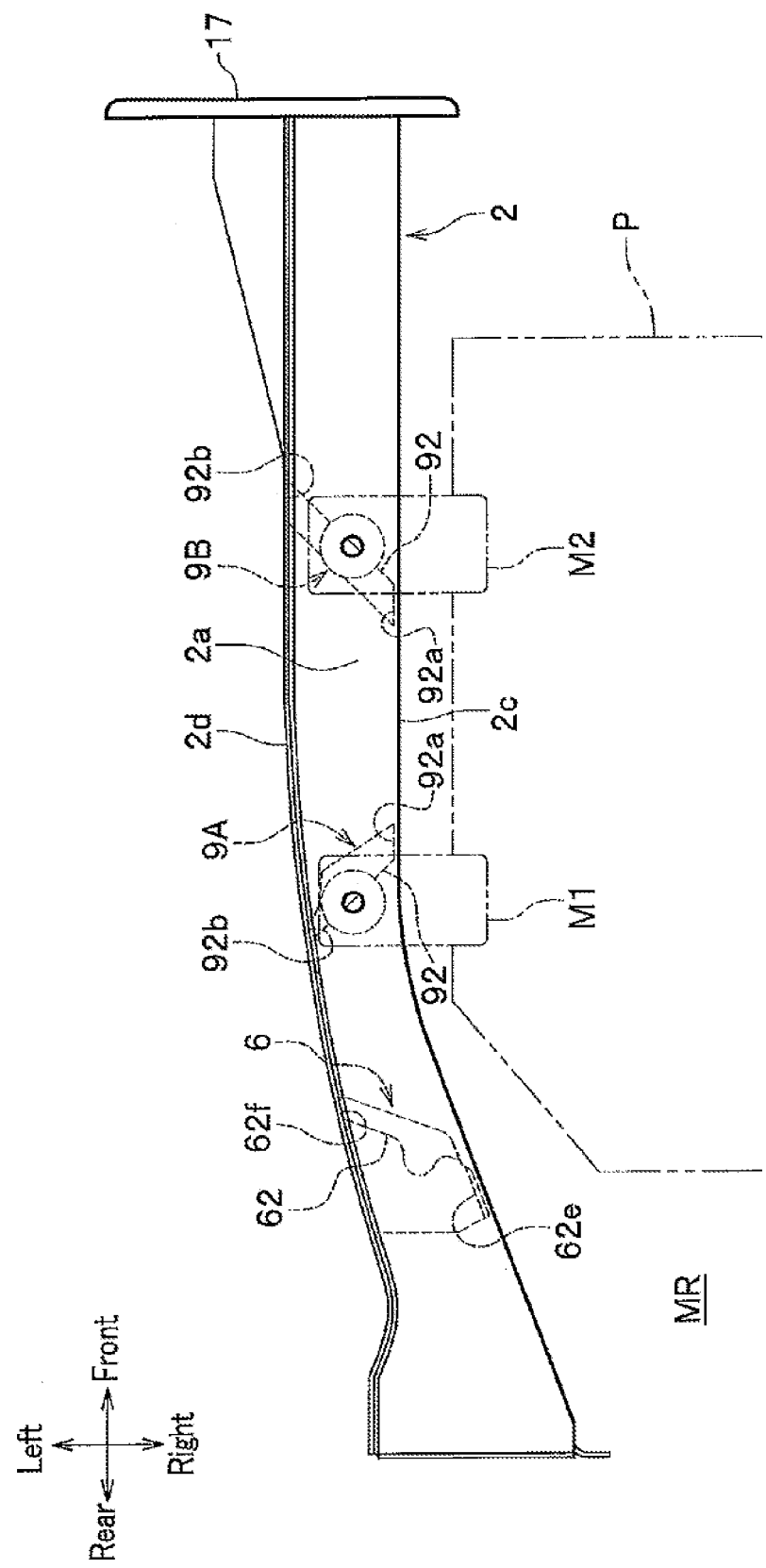
FIG. 5 is a plan view of the front side frame on the left side.

FIG. 1 is a perspective view of a structure of a front section of a vehicle body according to the first embodiment. FIG. 2 is an enlarged perspective view of a portion connecting a front side frame and a subframe. FIG. 3A is an upper front right perspective view of a first supporting member on the left side, and FIG. 3B is an upper rear left perspective view of the first supporting member on the left side. FIG. 4 is a lower front left perspective view of a connection of the front side frame on the left side and a reinforcing member. FIG. 5 is a plan view of the front side frame on the left side. For convenience of illustration, FIGS. 2 and 4 are partially cutaway diagrams of the front side frame.

As illustrated in FIGS. 1 and 2, the vehicle C having the front-section structure 1 of the vehicle body is an automobile having a power-source mounting room MR in the front section of the vehicle body, for example, an FF (front-engine, front-wheel drive), FR (front-engine, rear-wheel drive), or four-wheel drive car or the like. The model and type of the automobile is not specifically limited as long as a power unit P (illustrated in FIG. 5) such as an engine, a transmission, or an electric motor is installed as a power source for the driving wheels in the automobile.

The front-section structure 1 forms the front section of the vehicle C, and is constituted mainly by a pair of front side frames 2, a subframe 3, a pair of first mounting members 4, first fixing members 5 (illustrated in FIG. 2), first supporting members 6 (illustrated in FIG. 2), a pair of damper housings 7, and reinforcing members 8. The pair of front side frames 2 are arranged on the right and left sides of the power-source mounting room MR to extend in the front-rear direction. The subframe 3 is arranged between the damper housings 7 arranged on the right and left sides. The first mounting members 4 are respectively arranged below the front side frames 2. The first mounting members 4 are fixed to the front side frames 2 with the first fixing members 5. The first supporting members 6 support the first fixing members 5. The damper housings 7 enclose damper devices (not shown) for the front wheels. The reinforcing members 8 respectively reinforce the damper housings 7.

In addition, the front-section structure 1 further includes a pair of upper members 11, a pair of lower members 12, a dashboard 13, and a front bulk head 14. The upper members 11 are arranged outside and above the front side frames 2 on the right and left sides to extend in the front-rear direction. The lower members 12 arranged on the right and left sides extend from the middle portions of the upper members 11 toward a forward down direction. The dashboard 13 separates the power-source mounting room MR and the vehicle interior R. The front bulk head 14 is arranged on the front side of the power-source mounting room MR. The front ends of the lower members 12 are connected to the front ends of the front side frames 2 via connection members 17.

Further, since the front-section structure 1 according to the present embodiment is a bilaterally symmetric structure, only the left side of the vehicle C is explained below, and explanation on the structure on the right side is omitted. Furthermore, in the following explanations, the power-source mounting room MR side may be referred to as the inner side of the vehicle, and the side opposite to the power-source mounting room MR may be referred to as the outer side of the vehicle.

Each front side frame 2 is a frame member having a hollow shape, and has a function of absorbing shocks by being crushed in the front-rear direction in a bellows-like manner when the vehicle crashes. As illustrated in FIG. 2, the front side frame 2 is formed to be a square tube-like member having a closed cross section, by joining an inner member 21 and an outer member 22. The inner member 21 has a hat-like cross section and includes an upper wall 2a, a lower wall 2b, and an inner wall 2c. The outer member 22 has a planar shape and constitutes an outer wall 2d. In addition, the rear end of the front side frame 2 is bent downward and connected to a floor frame 16 below the dashboard 13. The front end of the front side frame 2 is connected to the front bulk head 14 (as illustrated in FIG. 1). Further, the front side frame 2 contains therein the first supporting member 6 and two second supporting members 9A and 9B, where the first supporting member 6 is arranged for mounting the first mounting member 4, and the second supporting members 9A and 9B are arranged for mounting second mounting members M1 and M2 (illustrated in FIG. 5). The first supporting member 6 and the second supporting members 9A and 9B are explained later.

Referring back to FIG. 1, the subframe 3 is a member which supports the power unit P (illustrated in FIG. 5) from the lower side. The subframe 3 includes a body portion 31 and a plurality of arm portions 32, 33, and 34, where the plurality of arm portions 32, 33, and 34 extend from the body portion 31. (Although only the left side is illustrated, the subframe 3 according to the present embodiment has six arm portions in total.) Specifically, the arm portions 32 on the right and left sides extend rightward and leftward from the body portion 31, and are connected to the front side frames 2 via the first mounting members 4. The arm portions 33 on the right and left sides extend forward from the body portion 31, and are connected to the front bulk head 14. The arm portions 34 on the right and left sides extend rearward from the body portion 31, and are connected to the floor frame 16.

The damper housings 7, as portions of the vehicle body, are portions which receive the damper devices (not shown) arranged for absorbing shocks from the front wheels. The side surfaces of the damper housings 7 are bent to have approximately an arched shape convex to the power-source mounting room MR side. The bottom end 7a of each damper housing 7 is connected to one of the front side frames 2, and the top 7b end of the damper housing 7 is connected to one of the upper members 11. In addition, a strut tower bar 15 is arranged to bridge the damper housings 7 on the right and left sides.

The reinforcing members 8 are concavely grooved members which are attached to the side surfaces of the damper housings 7. As illustrated in FIGS. 2 and 4, the reinforcing members 8 are arranged to extend in the vertical direction in such a manner that the opening of a concave groove 81 faces the damper housing 7 side. Each reinforcing member 8 includes a pair of first flange portions 82 and a second flange portion 83. The first flange portions 82 are arranged along the concave groove 81, and the second flange portion 83 is arranged at the bottom end. Specifically, the first flange portions 82 are fixed to one of the damper housings 7 by welding, and the second flange portion 83 is fixed to the upper wall 2a and the inner wall 2c of one of the front side frames 2 by welding. Therefore, a closed cross section is formed with the reinforcing member 8 and the damper housing 7, so that the strength and rigidity of the vehicle body are improved. In the present embodiment, each reinforcing member 8 is connected to the position of one of the front side frames 2 at which the rear end side of the front side frame 2 begins to bend from the front end side.

As illustrated in FIG. 2, the first mounting members 4 are members which support the arm portions 32 (extending rightward and leftward from the body portion 31 of the subframe 3), and arranged below the front side frames 2.

Each first mounting member 4 is fastened to the first supporting member 6 in one of the front side frames 2 with the first fixing member 5 such as a bolt which is inserted into the front side frame 2 through the first mounting member 4 from the lower side of the first mounting member 4. In addition, the first mounting member 4 is fastened to the subframe 3 with two bolts inserted into the first mounting member 4 in the horizontal direction through one of the arm portions 32 of the subframe 3 (which extend rightward and leftward).

As illustrated in FIGS. 2 to 5, the first supporting members 6 are members which support the aforementioned first fixing members 5, and arranged inside the front side frames 2. Each first supporting member 6 includes a holding portion 61 and a partition portion 62. The holding portion 61 has a cylindrical shape, and the first fixing member 5 is inserted into the holding portion 61. The partition portion 62 is arranged so as to extend across the inside of each front side frame 2 in the vehicle width direction.

As illustrated in FIGS. 3A and 3B, a female screw for holding the bolt as the first fixing member 5 is formed on an inner space 61a of the holding portion 61. In addition, a flange portion 61b which extends outward in the radial direction is arranged at the bottom portion of the holding portion 61. The flange portion 61b is in contact with the lower wall 2b of the front side frame 2. Further, a through-hole 2e for inserting the first fixing member 5 is formed in the lower wall 2b in the front side frame 2 at the position corresponding to the hollow in the holding portion 61 (as illustrated in FIG. 4).

The partition portion 62 is a wall-like member which separates the inner space of the front side frame 2 into front and rear sides. The partition portion 62 includes a partition body 62a, a concave portion 62b, an upper flange 62c, a lower flange 62d, an inner flange 62e, and an outer flange 62f. The concave portion 62b is arranged at approximately the center of the partition body 62a to extend in the vertical direction. The upper flange 62c, the lower flange 62d, the inner flange 62e, and the outer flange 62f respectively extend from the upper end, the lower end, and the lateral (outer and inner) ends of the partition body 62a. The holding portion 61 is fitted into the concave portion 62b and fixed by welding. The upper flange 62c and the outer flange 62f extend forward from the partition body 62a. The lower flange 62d and the inner flange 62e extend rearward from the partition body 62a. The upper flange 62c is fixed to the inner surface of the upper wall 2a of the front side frame 2 by welding, and the lower flange 62d is fixed to the inner surface of the lower wall 2b of the front side frame 2 by welding. The inner flange 62e is fixed to the inner surface of the inner wall 2c of the front side frame 2 by welding, and the outer flange 62f is fixed to the inner surface of the outer wall 2d of the front side frame 2 by welding. The bottom end 62g of the outer flange 62f is arranged to extend to the level below the partition body 62a and the lower flange 62d, and held between the inner member 21 and the outer member 22 (constituting the front side frame 2), as illustrated in FIGS. 2 and 4.

As illustrated in FIGS. 2 and 4, the first supporting member 6 is fixed to the inner surface of the front side frame 2 below the position at which the reinforcing member 8 is joined to the front side frame 2. In the present embodiment, a portion of the upper flange 62c of the first supporting member 6 is arranged directly under the second flange portion 83 of the reinforcing member 8, and the other portions are arranged below the second flange portion 83.

However, the arrangement of the first supporting member 6 is not limited to the arrangement explained above. Alternatively, it is possible to arrange the entire first supporting member 6 directly under the position at which the reinforcing member 8 is joined to the front side frame 2.

Further, as illustrated in FIG. 5, the partition portion 62 of the first supporting member 6 is arranged diagonal to the direction in which the front side frame 2 extends (and to the lateral direction), in such a manner that the outer flange 62*f* is located on the front side of the inner flange 62*e*.

As illustrated in FIGS. 2 and 5, the second support members 9A and 9B are members for fixing the second mounting members M1 and M2 to the front side frame 2, where the second mounting members M1 and M2 support an upper portion of the power unit P, which is mounted on the subframe 3. One 9A of the second support members is arranged inside the front side frame 2 on the front side of the first supporting member 6. The other 9B of the second support members is arranged inside the front side frame 2 on the front side of the second support member 9A. In addition, the second mounting members M1 and M2 are fastened to the upper wall 2*a* of the front side frame 2 with bolts as second fixing members 5A (as illustrated in FIG. 2, in which only the second support member 5A on the second supporting member 9B side is illustrated).

As illustrated in FIG. 2, the second supporting members 9A and 9B each have a holding portion 91 and a partition portion 92. The holding portion 91 has a cylindrical shape, and the second fixing member 5A is inserted into the holding portion 91. The partition portion 92 is arranged to extend across the inside of the front side frame 2 in the vehicle width direction. The holding portion 91 and the partition portion 92 are fixed by welding. A female screw is formed around an inner space 91*a* of the holding portion 91. An inner flange 92*a* is formed at an end of the partition portion 92 on the inner side of the vehicle (on the right side in FIG. 2), and fixed to the inner surface of the inner wall 2*c* of the front side frame 2. An outer flange 92*b* is formed at an end of the partition portion 92 on the outer side of the vehicle (on the left side in FIG. 2), and fixed to the inner surface of the outer wall 2*d* of the front side frame 2.

As illustrated in FIG. 5, the partition portion 92 of the second supporting member 9A is arranged diagonal to the direction in which the front side frame 2 extends (and to the lateral direction), in such a manner that the inner flange 92*a* is located on the front side of the outer flange 92*b*. Thus, the first supporting member 6 and the second support member 9A are arranged nonparallel to each other in such a manner that the distance between the first supporting member 6 and the second support member 9A is narrowed toward the outer side of the vehicle in plan view.

In addition, the partition portion 92 of the other second supporting member 9B is arranged diagonal to the direction in which the front side frame 2 extends (and to the lateral direction), in such a manner that the outer flange 92*b* is located on the front side of the inner flange 92*a*. Thus, the second support member 9A and the second support member 9B are arranged nonparallel to each other in such a manner that the distance between the second support member 9A and the second support member 9B is narrowed toward the inner side of the vehicle in plan view.

The front-section structure 1 according to the present embodiment is constructed as explained above. Next, the operations and the advantageous effect of the front-section structure 1 are explained below.

In the front-section structure 1 according to the present embodiment, the reinforcing members 8 reinforcing the damper housings 7 constituting the vehicle body are joined to the upper walls 2*a* of the front side frames 2, and the first supporting members 6 supporting the first fixing members 5 are fixed to the inner surfaces of the front side frames 2, respectively, below the positions at which the reinforcing members 8 are joined to the front side frames 2. Therefore, the support rigidity of the first mounting members 4 contributed by the front side frames 2 is improved. That is, since the reinforcing members 8 are joined to the front side frames 2 in the vicinities of the positions at which the first supporting members 6 are joined to the front side frames 2, the rigidity is improved in the vicinities of the joined positions. Therefore, deformation of the frame which can be caused by the force inputted from the tire side can be suppressed, and resultantly the support rigidity of the first mounting members 4 is improved.

In addition, according to the above structure, the support rigidity of the first mounting members 4 can be improved by use of the reinforcing members 8 which support the damper housings 7. Therefore, the number of parts can be reduced, and the manufacturing is facilitated.

Further, the support rigidity of the first mounting members 4 can be changed by only changing the structures of the first supporting members 6 (e.g., the length of the holding portion 61 or the thickness of the partition portion 62) without changing the structure of the front side frames 2. Therefore, various types of vehicles receiving different input loads can be coped with, and the front side frames 2 can be used in common.

Furthermore, since, in the front-section structure 1 according to the present invention, the partition portion 92 of the second support member 9A and the partition portion 62 of the first supporting member 6 are fixed, nonparallel to each other, to the inner surfaces of each front side frame 2 in such a manner that the distance between the partition portion 92 and the partition portion 62 is narrowed toward one side in plan view, the load at the time of a crash can be absorbed by appropriately deforming the front side frames 2 to project toward the side on which the distance between the partition portion 92 and the partition portion 62 is narrower (i.e., the outer side in the present embodiment).

On the other hand, since the second support member 9A and the second support member 9B are arranged nonparallel to each other in such a manner that the distance between the second support member 9A and the second support member 9B is narrowed toward the opposite side to the arrangement of the partition portion 92 and the partition portion 62, the bending load can be stably generated. Therefore, the load at the time of a crash can be absorbed by appropriately deforming and folding the front side frames 2 in their entire length from the front side to the rear side.

Next, a variation of the first supporting member 6 is explained with reference to FIGS. 6 and 7. FIG. 6 is a perspective view, viewed from the inner side of the vehicle, of a first supporting member in the variation, and FIG. 7 is a lower perspective view, viewed from the inner side of the vehicle, of the first supporting member in the variation. In FIGS. 6 and 7, a portion of the front side frame 2 and the reinforcing member 8 are illustrated by virtual lines (two-dot chain lines) for convenience of illustration.

The first supporting members 6A each include a holding portion 61 and a pair of partition portions 62A and 62B. The partition portions 62A and 62B are respectively arranged on the rear and front sides of the holding portion 61. The holding portion 61 is fixed to the pair of partition portions 62A and 62B via a bracket 63, which is arranged to bridge the partition portions 62A and 62B.

The rear-side partition portion 62A is a wall-like portion which separates the inner space of the front side frame 2 on the rear side of the holding portion 61, into the front and rear sides of the rear-side partition body 62A. The rear-side partition portion 62A includes a rear partition body 62Aa, an upper flange 62Ac, a lower flange 62Ad, an inner flange 62Ae, and an outer flange 62Af. The upper flange 62Ac, the lower flange 62Ad, the inner flange 62Ae, and the outer flange 62Af respectively extend from the upper end, the lower end, and the lateral (outer and inner) ends of the rear partition body 62Aa. The upper flange 62Ac, the lower flange 62Ad, and the inner flange 62Ae extend rearward from the rear partition body 62Aa. The outer flange 62Af extends forward from the rear partition body 62Aa. The upper flange 62Ac, the lower flange 62Ad, the inner flange 62Ae, and the outer flange 62Af are respectively fixed to the inner surfaces of the upper wall 2a, the lower wall 2b, the inner wall 2c, and the outer wall 2d of the front side frame 2.

The front-side partition portion 62B is a wall-like portion which separates the inner space of the front side frame 2 on the front side of the holding portion 61, into the front and rear sides of the front-side partition portion 62B. The front-side partition portion 62B includes a front partition portion 62Ba, an upper flange 62Bc, a lower flange 62Bd, an inner flange 62Be, and an outer flange 62Bf. The upper flange 62Bc, the lower flange 62Bd, the inner flange 62Be, and the outer flange 62Bf respectively extend from the upper end, the lower end, and the lateral (outer and inner) ends of the front partition portion 62Ba. The upper flange 62Bc, the lower flange 62Bd, and the inner flange 62Be extend forward from the front partition portion 62Ba. The outer flange 62Bf extends rearward from the front partition portion 62Ba. The upper flange 62Bc, the lower flange 62Bd, the inner flange 62Be, and the outer flange 62Bf are respectively fixed to the inner surfaces of the upper wall 2a, the lower wall 2b, the inner wall 2c, and the outer wall 2d of the front side frame 2.

In addition, in the above variation, the outer flange 62Af in the rear-side partition portion 62 and the outer flange 62Bf in the front-side partition portion 62B are continuously formed. In other words, the pair of partition portions 62A and 62B is formed with a groove-like member in which the outer flange 62Af and the outer flange 62Bf constitute a bottom wall, and the rear partition body 62Aa and the rear partition body 62Ba constitute an integrated side wall.

As illustrated in FIGS. 6 and 7, the first supporting member 6A according to the above variation is arranged below the position at which the reinforcing member 8 is joined to the front side frame 2. Specifically, the entire first supporting member 6A is arranged directly under the reinforcing member 8.

In the above structure, each first supporting member 6A according to the variation includes the holding portion 61 (which holds the first fixing member 5) and the pair of partition portions 62A and 62B (which are respectively arranged on the rear and front sides of the holding portion 61 and fixed to the inner surface of the front side frame 2). Therefore, the support rigidity of the first mounting member 4 is further improved compared with the case where only the single partition portion 62 is arranged. Thus, the front side frame 2 can be deformed in intended directions with high reliability when a crash occurs. In addition, since the extent of overlap of the first mounting member 4 and the reinforcing member 8 in the vertical direction increases, the support rigidity of the first mounting member 4 is further improved.

Although the front-section structures 1 according to an embodiment are explained above in detail with respect to the drawings, the present invention is not limited to the explained embodiment, and the embodiment can be modified as needed without departing from the gist of the present invention.

For example, although the bolts are indicated as examples of the first fixing members 5, the present invention is not limited to the use of bolts as the first fixing members 5, and other fixing members such as rivets may be used as long as the joining strength is sufficient.

In the explained embodiment, the narrower side of the nonparallel arrangement of the first supporting member 6 and the second support member 9A is directed to the outer side of the vehicle, and the narrower side of the nonparallel arrangement of the second support member 9A and the second support member 9B is directed to the inner side of the vehicle. Alternatively, the narrower sides in the above arrangements may be directed to the respectively opposite directions.

In the explained embodiment, the pair of partition portions 62A and 62B in each first supporting member 6A is realized by the single member, the present invention is not limited to such a structure, and the partition portions 62A and 62B may be realized by individually separate members.

LIST OF REFERENCE SIGNS

1: Front-section Structure 2: Front Side Frame 3: Subframe 4: First Mounting Member 5: First Fixing Member 6: First Supporting Member 61: Holding Portion 62: Partition portion 7: Damper Housing (Vehicle Body) 8: Reinforcing Members 9A, 9B: Second Supporting Members

The invention claimed is:

1. A structure for a front section of a vehicle body, comprising:
  a pair of front side frames which are respectively arranged on right and left sides of the front section of the vehicle body, have a hollow structure, and extend in a front-rear direction;
  a subframe which is arranged between the pair of front side frames;
  a pair of first mounting members which are respectively arranged on the right and left sides below the pair of front side frames, and respectively support right and left ends of the subframe;
  first fixing members which fix the first mounting members to lower portions of the front side frames;
  first supporting members which are arranged inside the front side frames, and support the first fixing members; and
  reinforcing members which are configured to reinforce the vehicle body;
  wherein:
  the reinforcing members are joined to upper portions of the front side frames;
  the first supporting members are fixed to inner surfaces of the front side frames below positions at which the reinforcing members are joined;
  the first supporting members include holding portions and partition portions, the holding portions hold the first fixing members, and the partition portions separate inner spaces of the front side frames into front and rear sides; and
  the partition portions have upper flanges which extend from upper ends of the partition portions, and are fixed by welding to positions on inner surfaces of upper walls of the front side frames which overlap the reinforcing members in a vertical direction.

2. The structure for the front section of the vehicle body according to claim 1, wherein the reinforcing members extend in a vertical direction of a vehicle, and are configured to reinforce damper housings.

3. The structure for the front section of the vehicle body according to claim 1, wherein the partition portions are arranged in pairs on front and rear sides of the holding portions, and both ends in the vertical direction and both ends in a vehicle width direction of the partition portions in pairs are respectively fixed to the inner surfaces of the front side frames.

4. The structure for the front section of the vehicle body according to claim 1, further comprising,
second mounting members which are arranged above the front side frames, and support a power unit,
second fixing members which fix the second mounting members to upper portions of the front side frames, and
second supporting members which are arranged inside the front side frames, and support the second fixing members; and
wherein each of the second supporting members includes at least one partition portion, which extends across an inner space in the front side frames in a vehicle width direction; and
the partition portion is fixed to an inner surface of the front side frames with an individually predetermined inclination angle with respect to a direction in which the front side frames extend.

5. The structure for a front section of a vehicle body, comprising:
a pair of front side frames which are respectively arranged on right and left sides of the front section of the vehicle body, have a hollow structure, and extend in a front-rear direction;
a subframe which is arranged between the pair of front side frames;
a pair of first mounting members which are respectively arranged on the right and left sides below the pair of front side frames, and respectively support right and left ends of the subframe;
first fixing members which fix the first mounting members to lower portions of the front side frames;
first supporting members which are arranged inside the front side frames, and support the first fixing members;
reinforcing members which are configured to reinforce the vehicle body;
second mounting members which are arranged above the front side frames, and support a power unit;
second fixing members which fix the second mounting members to upper portions of the front side frames; and
second supporting members which are arranged inside the front side frames, and support the second fixing members,
wherein:
the reinforcing members are joined to upper portions of the front side frames;
the first supporting members are fixed to inner surfaces of the front side frames below positions at which the reinforcing members are joined;
the first supporting members include holding portions and partition portions, the holding portions hold the first fixing members, and the partition portions separate inner spaces of the front side frames into front and rear sides;
the partition portions of the first supporting members have upper flanges which extend from upper ends of the partition portions, and are fixed by welding to positions on inner surfaces of upper walls of the front side frames which overlap the reinforcing members in a vertical direction;
each of the second supporting members includes at least one partition portion, which extends across an inner space in the front side frames in a vehicle width direction;
the partition portion is fixed to an inner surface of the front side frames with an individually predetermined inclination angle with respect to a direction in which the front side frames extend; and
the partition portions in the first supporting members and the at least one partition portion in the second supporting members are fixed to the inner surfaces of the front side frames with inclination angles, which are set such that the partition portion in the first supporting members and the partition portion in the second supporting members are arranged nonparallel to each other.

6. The structure for the front section of the vehicle body according to claim 2, further comprising,
second mounting members which are arranged above the front side frames, and support a power unit,
second fixing members which fix the second mounting members to upper portions of the front side frames, and
second supporting members which are arranged inside the front side frames, and support the second fixing members; and
wherein each of the first supporting members and the second supporting members includes a partition portion, which extends across an inner space in the front side frames in a vehicle width direction; and
the partition portion is fixed to an inner surface of the front side frames with an individually predetermined inclination angle with respect to a direction in which the front side frames extend.

7. The structure for the front section of the vehicle body according to claim 3, further comprising,
second mounting members which are arranged above the front side frames, and support a power unit,
second fixing members which fix the second mounting members to upper portions of the front side frames, and
second supporting members which are arranged inside the front side frames, and support the second fixing members; and
wherein each of the first supporting members and the second supporting members includes a partition portion, which extends across an inner space in the front side frames in a vehicle width direction; and
the partition portion is fixed to an inner surface of the front side frames with an individually predetermined inclination angle with respect to a direction in which the front side frames extend.

8. The structure for the front section of the vehicle body according to claim 6, wherein the partition portions in the first supporting members and the partition portion in the second supporting members are fixed to the inner surfaces of the front side frames with inclination angles, which are set such that the partition portion in the first supporting members and the partition portion in the second supporting members are arranged nonparallel to each other.

9. The structure for the front section of the vehicle body according to claim 7, wherein the partition portions in the first supporting members and the partition portion in the second supporting members are fixed to the inner surfaces of the front side frames with inclination angles, which are set such that the partition portion in the first supporting members and the partition portion in the second supporting members are arranged nonparallel to each other.

10. The structure for the front section of the vehicle body according to claim 5, wherein the reinforcing members extend in a vertical direction of a vehicle, and are configured to reinforce damper housings.

11. The structure for the front section of the vehicle body according to claim 5, wherein the partition portions are arranged in pairs on front and rear sides of the holding portions, and both ends in the vertical direction and both ends in a vehicle width direction of the partition portions in pairs are respectively fixed to the inner surfaces of the front side frames.

* * * * *